(12) United States Patent
Maruyama et al.

(10) Patent No.: US 12,517,327 B2
(45) Date of Patent: Jan. 6, 2026

(54) OPTICAL SYSTEM

(71) Applicants: Kantatsu Co., Ltd, Tokyo (JP); Sharp Display Technology Corporation, Mie (JP)

(72) Inventors: Ryo Maruyama, Tokyo (JP); Naru Usukura, Mie (JP)

(73) Assignees: Kantatsu Co., Ltd, Tokyo (JP); Sharp Display Technology Corporation, Mie (JP)

(*) Notice: Subject to any disclaimer, the term of this patent is extended or adjusted under 35 U.S.C. 154(b) by 297 days.

(21) Appl. No.: 18/499,185

(22) Filed: Oct. 31, 2023

(65) Prior Publication Data

US 2024/0168282 A1 May 23, 2024

(30) Foreign Application Priority Data

Nov. 21, 2022 (JP) .................... 2022-185927

(51) Int. Cl.
| | |
|---|---|
| *G02B 13/00* | (2006.01) |
| *G02B 5/30* | (2006.01) |
| *G02B 27/00* | (2006.01) |
| *G02B 27/01* | (2006.01) |
| *G02B 27/09* | (2006.01) |
| *G02B 27/28* | (2006.01) |
| *G02F 1/1335* | (2006.01) |
| *G02F 1/13363* | (2006.01) |

(52) U.S. Cl.
CPC ......... *G02B 13/003* (2013.01); *G02B 5/3083* (2013.01); *G02B 27/0025* (2013.01); *G02B 27/0955* (2013.01); *G02B 27/0977* (2013.01); *G02B 27/283* (2013.01); *G02F 1/133536* (2013.01); *G02F 1/13363* (2013.01); *G02B 27/0172* (2013.01)

(58) Field of Classification Search
CPC .. G02B 13/003; G02B 27/283; G02B 5/3083; G02B 5/3025; G02B 5/3033; G02F 1/133536; G02F 1/13363; G02F 1/133638
See application file for complete search history.

(56) References Cited

U.S. PATENT DOCUMENTS

| | | | |
|---|---|---|---|
| 2021/0271082 A1* | 9/2021 | Smith | G02B 5/3083 |
| 2024/0310633 A1* | 9/2024 | Hudman | G02B 27/0955 |

FOREIGN PATENT DOCUMENTS

JP 3441188 8/2003

* cited by examiner

*Primary Examiner* — Jia X Pan
(74) *Attorney, Agent, or Firm* — JCIPRNET

(57) ABSTRACT

An optical system includes, in order from a pupil surface side to a display surface side, a first reflective polarizing plate, a first lens having a positive refractive power, a half mirror, a second lens having a positive refractive power, and a second reflective polarizing plate. The optical system further includes a first quarter wave plate arranged between a pupil surface and the half mirror, and a second quarter wave plate arranged between the half mirror and a display surface. The second lens has a paraxially convex surface on the pupil surface side. Further, in the case where a paraxial curvature radius of a surface of the first lens on the pupil surface side is r1 and a paraxial curvature radius of a surface of the first lens on the display surface side is r2, the optical system satisfies a conditional expression below: $-3.2 < r1/r2 < -0.9$.

7 Claims, 8 Drawing Sheets

OPTICAL SYSTEM

CROSS-REFERENCE TO RELATED APPLICATION

This application claims the priority benefit of Japan application serial no. 2022-185927, filed on Nov. 21, 2022. The entirety of the above-mentioned patent application is hereby incorporated by reference herein and made a part of this specification.

BACKGROUND

Technical Field

The disclosure relates to an optical system that enlarges an image (e.g., an image displayed on an image display element).

Related Art

As display devices using image display elements, electronic viewfinders, electronic binoculars, and head-mounted displays have been known.

In such display devices, the distance between the image display element and the eye is required to be as little as possible. Since an optical system mounted on such display devices is accommodated within a limited space, elimination of various aberrations is difficult, and the range of correction to the aberrations is also limited. Thus, it becomes important in the design of the optical system to make use of the physiological optical characteristics of the eye to complement each other.

Visual acuity depends on the density of cone cells in the photoreceptor, and the eye has a characteristic of forming a clear image near the fovea of the macula, that is, near the center of the pupil. By narrowing the pupil, the depth of focus increases, and the effects of spherical aberration and comatic aberration are reduced, so it is possible to reduce sensitivity to blurring even if there are deficiencies in these aberrations and refractive correction. Further, by exploiting the phenomenon that the sensitivity of light rays entering from the periphery is lower than the sensitivity of light rays passing through the center of the pupil, so-called Stiles-Crawford effect, it is possible to reduce the effects of spherical aberration, comatic aberration, and chromatic aberration. By maintaining this state, adaptation gradually occurs, which makes it possible to reduce the effect of distortion as well.

The optical system mounted on such display devices often requires high light quantity efficiency along with miniaturization. Herein, light quantity efficiency refers to a ratio of the quantity of light reaching the eye (pupil surface) in the case where the quantity of light on the display surface of the image display element is taken as 100%.

As a conventional optical system, for example, the optical system described in Patent Document 1 (Japanese Patent No. 3441188) has been known. Patent Document 1 discloses an optical system including a partial optical system having two semi-transmissive surfaces and a refractive optical element having a power.

Even if one attempts to achieve miniaturization and improvement in light quantity efficiency according to the optical system described in Patent Document 1, it is difficult to improve the light quantity efficiency due to the two semi-transmissive surfaces, and it is not possible to obtain good optical performance.

SUMMARY

An optical system according to the invention of the disclosure includes, in order from a pupil surface side to a display surface side, a first reflective polarizing plate, a first lens having a positive refractive power, a half mirror, a second lens having a positive refractive power, and a second reflective polarizing plate. The optical system further includes a first quarter wave plate arranged between a pupil surface and the half mirror, and a second quarter wave plate arranged between the half mirror and a display surface. The second lens has a paraxially convex surface on the pupil surface side. In this specification, a convex surface, a concave surface, and a flat surface of a lens refer to paraxial shapes, and the refractive power refers to a paraxial refractive power unless otherwise specified.

The reflective polarizing plate reflects linearly polarized light having a specific polarization direction and allows linearly polarized light having a polarization direction orthogonal thereto to pass through.

The quarter wave plate converts linearly polarized light into circularly polarized light and converts circularly polarized light into linearly polarized light by delaying the phase of polarized light by $1/4 \lambda$.

Having a positive refractive power, the first lens restrains spherical aberration, astigmatism, field curvature, and distortion.

The half mirror allows 50% of the light rays to pass through and reflects the remaining 50% of the light rays.

Having a positive refractive power, the second lens well corrects spherical aberration, comatic aberration, astigmatism, field curvature, and distortion.

In the optical system of the invention of the disclosure, the first reflective polarizing plate, the first lens having a positive refractive power, and the first quarter wave plate constitute a pupil-side element group, and the second quarter wave plate, the second lens having a positive refractive power, and the second reflective polarizing plate constitute a display surface-side element group. The pupil-side element group and the display surface-side element group are arranged to be substantially symmetrical with respect to a semi-transmissive surface of the half mirror as a center. Thus, by eventually overlapping two lights including a light reflected and a light transmitted at the half mirror, it is possible to achieve improvement in light quantity efficiency while achieving miniaturization of the optical system.

In the optical system having the above configuration, the first lens may have a paraxially convex surface on the pupil surface side.

By configuring the surface of the first lens on the pupil surface side as a paraxially convex surface, it becomes possible to well correct spherical aberration, astigmatism, field curvature, and distortion.

Further, in the optical system having the above configuration, the first lens may have a paraxially convex surface on the display surface side.

By configuring the surface of the first lens on the display surface side as a paraxially convex surface, it becomes possible to well correct astigmatism, field curvature, and distortion.

In the optical system having the above configuration, the second lens may have a paraxially convex surface on the display surface side.

By configuring the surface of the second lens on the display surface side as a paraxially convex surface, it becomes possible to well correct comatic aberration, astigmatism, field curvature, and distortion.

The optical system having the above configuration may satisfy Conditional Expression (1) below.

$$-3.2 < r1/r2 < -0.9 \quad (1)$$

Herein, r1 is a paraxial curvature radius of the surface of the first lens on the pupil surface side, and r2 is a paraxial curvature radius of the surface of the first lens on the display surface side.

By satisfying the range of Conditional Expression (1), it becomes possible to well correct spherical aberration, astigmatism, field curvature, and distortion.

The optical system having the above configuration may satisfy Conditional Expression (2) below.

$$1.5 < (T1/f1) \times 100 < 7.0 \quad (2)$$

Herein, T1 is a distance on an optical axis from the surface of the first lens on the display surface side to the surface of the second lens on the pupil surface side, and f1 is a focal length of the first lens.

By satisfying the range of Conditional Expression (2), it becomes possible to achieve height reduction and well correct spherical aberration, astigmatism, field curvature, and distortion.

The optical system having the above configuration may satisfy Conditional Expression (3) below.

$$2.0 < f1/f < 6.5 \quad (3)$$

Herein, f1 is a focal length of the first lens, and f is a focal length of the entire optical system.

By satisfying the range of Conditional Expression (3), it becomes possible to well correct spherical aberration, astigmatism, field curvature, and distortion.

The optical system having the above configuration may satisfy Conditional Expression (4) below.

$$0.5 < f1/f2 < 1.5 \quad (4)$$

Herein, f1 is a focal length of the first lens, and f2 is a focal length of the second lens.

By satisfying the range of Conditional Expression (4), it becomes possible to well correct spherical aberration, comatic aberration, astigmatism, field curvature, and distortion.

The optical system having the above configuration may satisfy Conditional Expression (5) below.

$$-1.5 < r1/r4 < -0.5 \quad (5)$$

Herein, r1 is a paraxial curvature radius of the surface of the first lens on the pupil surface side, and r4 is a paraxial curvature radius of the surface of the second lens on the display surface side.

By satisfying the range of Conditional Expression (5), it becomes possible to well correct spherical aberration, comatic aberration, astigmatism, field curvature, and distortion.

The optical system having the above configuration may satisfy Conditional Expression (6) below.

$$-79 < r2/hm1 < -20 \quad (6)$$

Herein, r2 is a paraxial curvature radius of the surface of the first lens on the display surface side, and hm1 is a distance on an optical axis from the surface of the first lens on the display surface side to the surface of the half mirror on the pupil surface side.

By satisfying the range of Conditional Expression (6), it becomes possible to achieve height reduction and well correct astigmatism, field curvature, and distortion.

The optical system having the above configuration may satisfy Conditional Expression (7) below.

$$55 < f2/hm2 < 285 \quad (7)$$

Herein, f2 is a focal length of the second lens, and hm2 is a distance on an optical axis from the surface of the half mirror on the display surface side to the surface of the second lens on the pupil surface side.

By satisfying the range of Conditional Expression (7), it becomes possible to achieve height reduction and well correct spherical aberration, comatic aberration, astigmatism, field curvature, and distortion.

The optical system having the above configuration may satisfy Conditional Expression (8) below.

$$27 < vd2 < 84 \quad (8)$$

Herein, vd2 is an Abbe number with respect to a d-line of the second lens.

By satisfying the range of Conditional Expression (8), it becomes possible to well correct chromatic aberration.

The optical system having the above configuration may satisfy Conditional Expression (9) below.

$$4.25 < (D1/f1) \times 100 < 16.50 \quad (9)$$

Herein, D1 is a thickness of the first lens on an optical axis, and f1 is a focal length of the first lens.

By satisfying the range of Conditional Expression (9), it becomes possible to achieve height reduction and well correct spherical aberration, astigmatism, field curvature, and distortion.

The optical system having the above configuration may satisfy Conditional Expression (10) below.

$$4.25 < (D2/f2) \times 100 < 16.50 \quad (10)$$

Herein, D2 is a thickness of the second lens on an optical axis, and f2 is a focal length of the second lens.

By satisfying the range of Conditional Expression (10), it becomes possible to achieve height reduction and well correct spherical aberration, comatic aberration, astigmatism, field curvature, and distortion.

The optical system having the above configuration may satisfy Conditional Expression (11) below.

$$2.0 < f2/f < 6.5 \quad (11)$$

Herein, f2 is a focal length of the second lens, and f is a focal length of the entire optical system.

By satisfying the range of Conditional Expression (11), it becomes possible to well correct spherical aberration, comatic aberration, astigmatism, field curvature, and distortion.

The optical system having the above configuration may satisfy Conditional Expression (12) below.

$$3 < r1/f < 10 \quad (12)$$

Herein, r1 is a paraxial curvature radius of the surface of the first lens on the pupil surface side, and f is a focal length of the entire optical system.

By satisfying the range of Conditional expression (12), it becomes possible to well correct spherical aberration, astigmatism, field curvature, and distortion.

The optical system having the above configuration may satisfy Conditional Expression (13) below.

$$17.5 < r1/T1 < 71.0 \quad (13)$$

Herein, r1 is a paraxial curvature radius of the surface of the first lens on the pupil surface side, and T1 is a distance on an optical axis from the surface of the first lens on the display surface side to the surface of the second lens on the pupil surface side.

By satisfying the range of Conditional Expression (13), it becomes possible to achieve height reduction and well correct spherical aberration, astigmatism, field curvature, and distortion.

The optical system having the above configuration may satisfy Conditional Expression (14) below.

$$5.0 < r1/(D1+T1) < 18.5 \qquad (14)$$

Herein, r1 is a paraxial curvature radius of the surface of the first lens on the pupil surface side, D1 is a thickness of the first lens on an optical axis, and T1 is a distance on the optical axis from the surface of the first lens on the display surface side to the surface of the second lens on the pupil surface side.

By satisfying the range of Conditional Expression (14), it becomes possible to achieve height reduction and well correct spherical aberration, astigmatism, field curvature, and distortion.

The optical system having the above configuration may satisfy Conditional Expression (15) below.

$$-1.5 < r2/r3 < -0.5 \qquad (15)$$

Herein, r2 is a paraxial curvature radius of the surface of the first lens on the display surface side, and r3 is a paraxial curvature radius of the surface of the second lens on the pupil surface side.

By satisfying the range of Conditional Expression (15), it becomes possible to well correct comatic aberration, astigmatism, field curvature, and distortion.

The optical system having the above configuration may satisfy Conditional Expression (16) below.

$$-5.5 < r2/f < -1.5 \qquad (16)$$

Herein, r2 is a paraxial curvature radius of the surface of the first lens on the display surface side, and f is a focal length of the entire optical system.

By satisfying the range of Conditional Expression (16), it becomes possible to well correct astigmatism, field curvature, and distortion.

The optical system having the above configuration may satisfy Conditional Expression (17) below.

$$-40.0 < r2/T1 < -8.5 \qquad (17)$$

Herein, r2 is a paraxial curvature radius of the surface of the first lens on the display surface side, and T1 is a distance on an optical axis from the surface of the first lens on the display surface side to the surface of the second lens on the pupil surface side.

By satisfying the range of Conditional Expression (17), it becomes possible to achieve height reduction and well correct astigmatism, field curvature, and distortion.

The optical system having the above configuration may satisfy Conditional Expression (18) below.

$$1.5 < r3/f < 5.5 \qquad (18)$$

Herein, r3 is a paraxial curvature radius of the surface of the second lens on the pupil surface side, and f is a focal length of the entire optical system.

By satisfying the range of Conditional Expression (18), it becomes possible to well correct comatic aberration, astigmatism, field curvature, and distortion.

The optical system having the above configuration may satisfy Conditional Expression (19) below.

$$0.35 < r3/f2 < 1.25 \qquad (19)$$

Herein, r3 is a paraxial curvature radius of the surface of the second lens on the pupil surface side, and f2 is a focal length of the second lens.

By satisfying the range of Conditional Expression (19), it becomes possible to well correct spherical aberration, comatic aberration, astigmatism, field curvature, and distortion.

The optical system having the above configuration may satisfy Conditional Expression (20) below.

$$-0.85 < r3/r4 < -0.20 \qquad (20)$$

Herein, r3 is a paraxial curvature radius of the surface of the second lens on the pupil surface side, and r4 is a paraxial curvature radius of the surface of the second lens on the display surface side.

By satisfying the range of Conditional Expression (20), it becomes possible to well correct comatic aberration, astigmatism, field curvature, and distortion.

The optical system having the above configuration may satisfy Conditional Expression (21) below.

$$-10 < r4/f < -3 \qquad (21)$$

Herein, r4 is a paraxial curvature radius of the surface of the second lens on the display surface side, and f is a focal length of the entire optical system.

By satisfying the range of Conditional Expression (21), it becomes possible to well correct comatic aberration, astigmatism, field curvature, and distortion.

The optical system having the above configuration may satisfy Conditional Expression (22) below.

$$-2.5 < r4/f2 < -0.7 \qquad (22)$$

Herein, r4 is a paraxial curvature radius of the surface of the second lens on the display surface side, and f2 is a focal length of the second lens.

By satisfying the range of Conditional Expression (22), it becomes possible to well correct spherical aberration, comatic aberration, astigmatism, field curvature, and distortion.

According to the invention of the disclosure, it is possible to obtain a high-resolution optical system with various aberrations well corrected while satisfying the requirements for miniaturization and improvement in light quantity efficiency in a balanced manner. Further, according to the optical system of the disclosure, since light quantity efficiency is improved, it is possible to provide an environmentally friendly optical system by reducing power consumption in the image display element.

DESCRIPTION OF THE EMBODIMENTS

An embodiment of the disclosure provides an optical system having a high resolution with various aberrations well corrected while satisfying the requirements for miniaturization and improvement in light quantity efficiency in a balanced manner.

Hereinafter, an embodiment embodying the disclosure will be described in detail with reference to the drawings.

Figure 1:
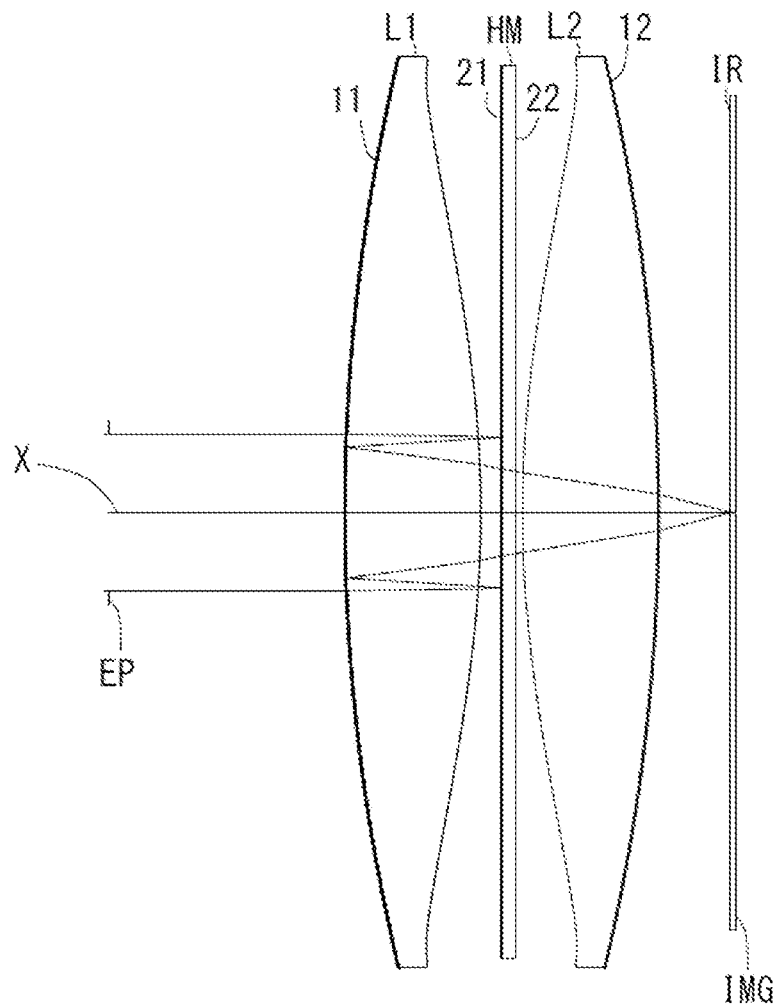
FIG. 1 is a cross-sectional view showing a schematic configuration of an optical system according to Example 1 of the disclosure.
Figure 3:
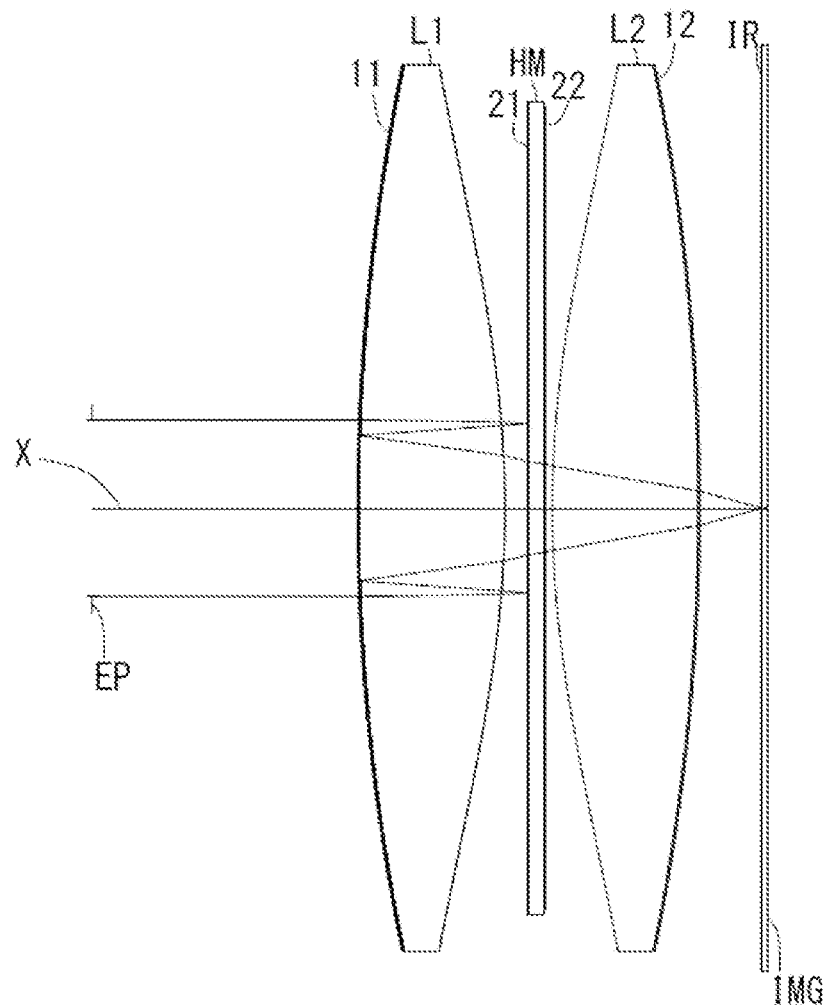
FIG. 3 is a cross-sectional view showing a schematic configuration of an optical system according to Example 2 of the disclosure.
Figure 5:
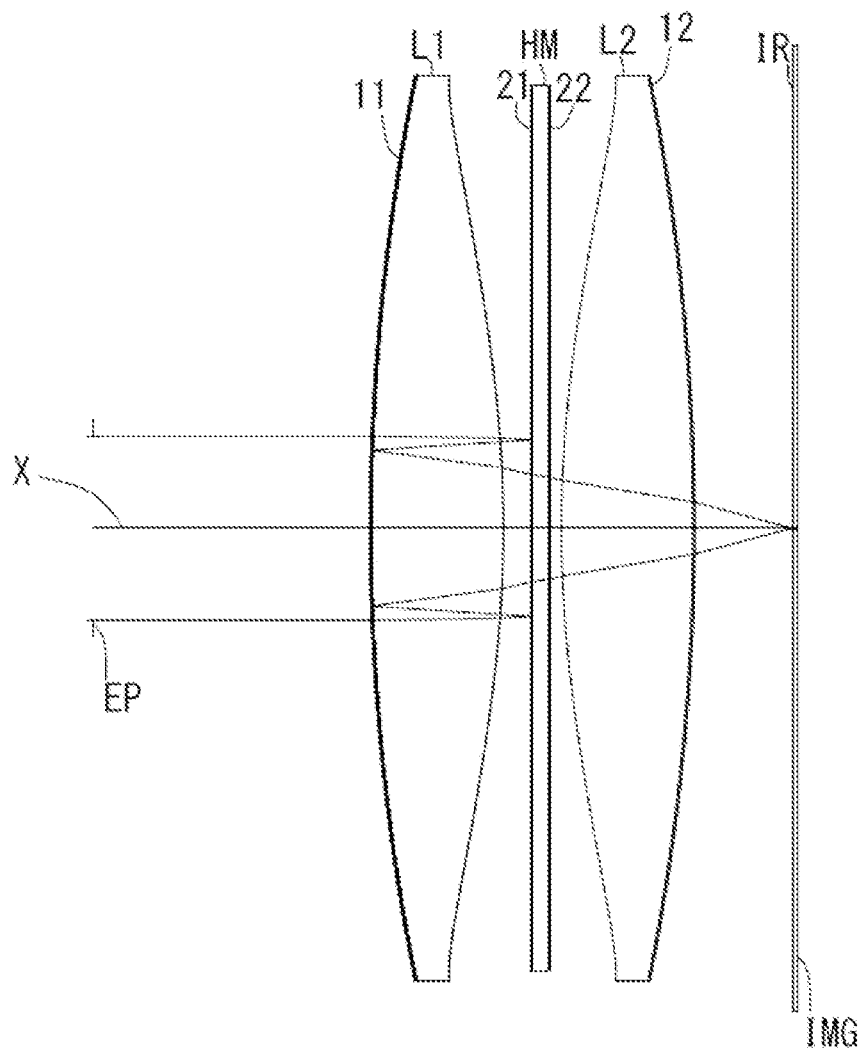
FIG. 5 is a cross-sectional view showing a schematic configuration of an optical system according to Example 3 of the disclosure.
Figure 7:
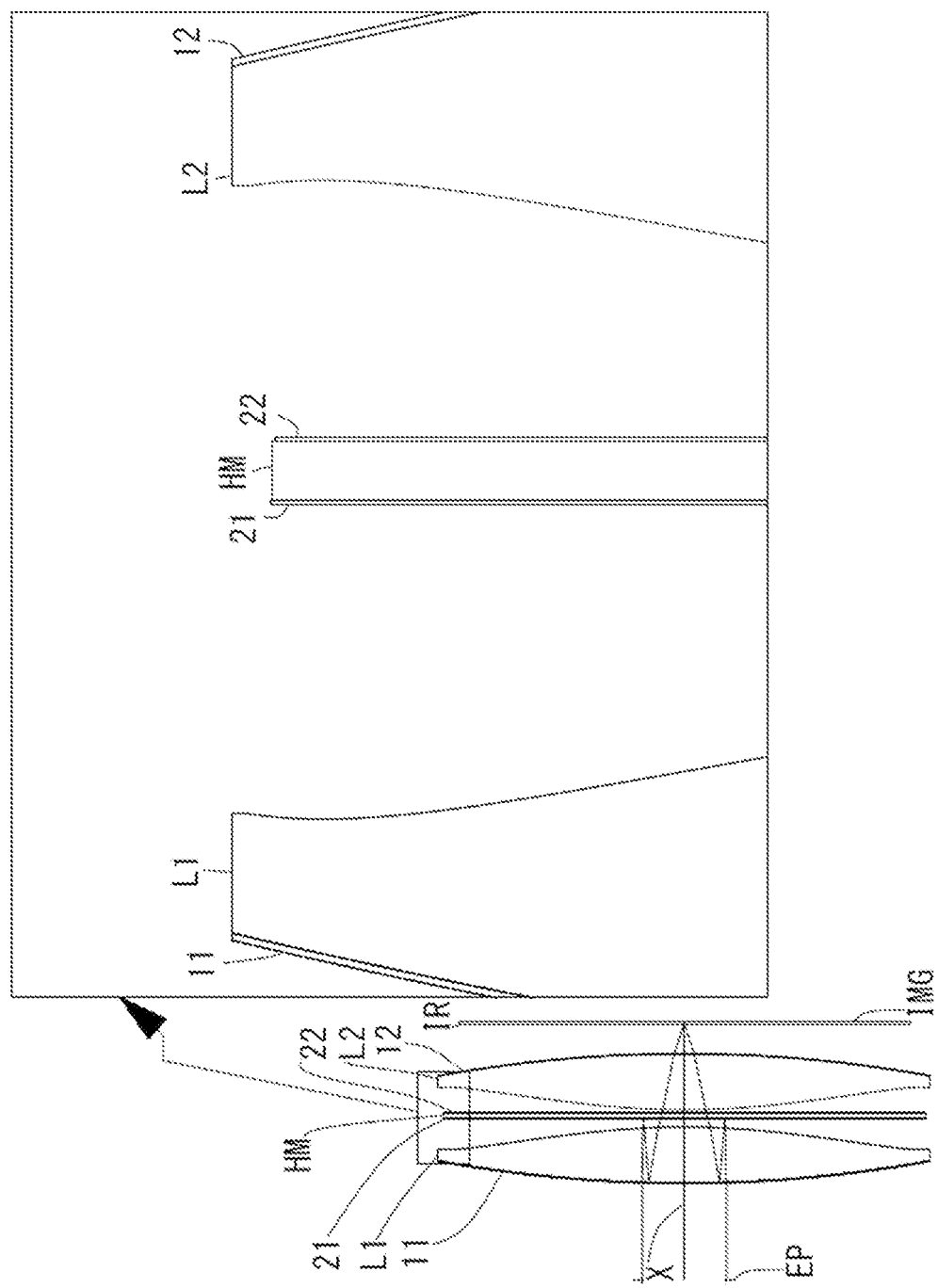
FIG. 7 is a partially enlarged view of the optical system shown in FIG. 1.

FIG. 1, FIG. 3, and FIG. 5 are respectively cross-sectional views showing schematic configurations of optical systems of Example 1 to Example 3 according to the present embodiment. FIG. 7 is a partially enlarged view of the optical system of Example 1. Hereinafter, details of the optical system according to the present embodiment will be described with reference to the optical system of Example 1.

As shown in FIG. 1 and FIG. 7, the optical system according to the present embodiment includes, in order from a pupil surface EP side to a display surface IMG side of an image display element, a first reflective polarizing plate 11, a first lens L1 having a positive refractive power, a half mirror HM, a second lens L2 having a positive refractive power, and a second reflective polarizing plate 12. The optical system further includes a first quarter wave plate 21 arranged between a pupil surface EP and the half mirror HM, and a second quarter wave plate 22 arranged between the half mirror HM and a display surface IMG. A filter IR such as a glass block is arranged between the optical system and the display surface IMG. The filter IR may be omitted.

In the optical system, the first reflective polarizing plate 11, the first lens L1, and the first quarter wave plate 21 constitute a pupil-side element group, and the second quarter wave plate 22, the second lens L2, and the second reflective polarizing plate 12 constitute a display surface-side element group. The pupil-side element group and the display surface-side element group are arranged substantially symmetrically with respect to a semi-transmissive surface of the half mirror HM as a center.

The mounting target of the optical system according to the present embodiment is not particularly limited, but the optical system may be mounted as an optical system of a head-mounted display, for example. In that case, an observer's pupil will be positioned at the pupil surface EP. A light quantity diaphragm may be arranged at the pupil surface EP.

A surface of the first reflective polarizing plate 11 on the display surface IMG side and a surface of the first lens L1 on the pupil surface side have the same shape, and the two are adhered together by an adhesive or the like. The first lens L1 has a paraxially biconvex shape. Accordingly, it is possible to restrain spherical aberration, astigmatism, field curvature, and distortion.

The first quarter wave plate 21, the half mirror HM, and the second quarter wave plate 22 each have a flat plate shape. In the optical system according to the present embodiment, the first quarter wave plate 21 is arranged between the first lens L1 and the half mirror HM, and the second quarter wave plate 22 is arranged between the half mirror HM and the second lens L2, with the half mirror HM being sandwiched between the first quarter wave plate 21 and the second quarter wave plate 22. Further, by adhering the first quarter wave plate 21 and the second quarter wave plate 22 to the half mirror HM, ease of assembly is improved while miniaturization of the optical system is achieved.

The first quarter wave plate 21 may also be arranged between the first reflective polarizing plate 11 and the first lens L1, and the second quarter wave plate 22 may also be arranged between the second lens L2 and the second reflective polarizing plate 12.

The second lens L2 has a paraxially convex surface on the pupil surface side. In the present embodiment, the second lens L2 has a paraxially biconvex shape. According to this shape of the second lens L2, spherical aberration, comatic aberration, astigmatism, field curvature, and distortion can be well corrected.

A surface of the second lens L2 on the display surface IMG side and a surface of the second reflective polarizing plate 12 on the pupil surface EP side have the same shape, and the two are adhered together by an adhesive or the like.

As described above, in the optical system according to the present embodiment, two lenses in biconvex shapes, i.e., the first lens L1 and the second lens L2, are arranged in a manner sandwiching the half mirror HM from two sides. In addition to this basic configuration, by arranging each of the first reflective polarizing plate 11, the first quarter wave plate 21, the second quarter wave plate 22, and the second reflective polarizing plate 12 at appropriate positions, light quantity efficiency in the optical system is improved. This point will be described in detail below.

As a device including the display surface IMG, for example, a micro organic light emitting diode (OLED) display may be adopted. The micro OLED display emits circularly polarized light from the display surface IMG.

Figure 8A:
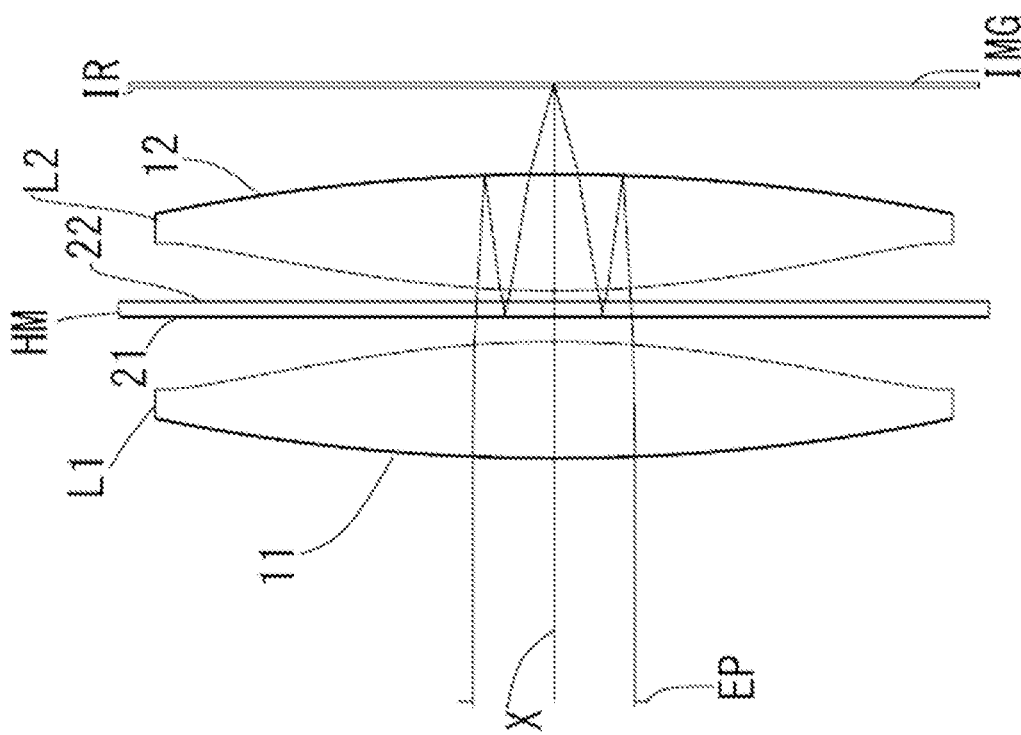
FIG. 8A is a cross-sectional view showing a path 1 in the optical system shown in FIG. 5.

As shown in FIG. 8A, the light emitted from the display surface IMG is converted into linearly polarized light by the second reflective polarizing plate 12, and is converted into circularly polarized light by the second quarter wave plate 22 and enters the half mirror HM. A part of the light entered the half mirror HM passes through the half mirror HM, is converted by the first quarter wave plate 21 into linearly polarized light in a same polarization direction as when passing through the second reflective polarizing plate 12, and enters the first reflective polarizing plate 11. This linearly polarized light is reflected due to the polarization selectivity of the first reflective polarizing plate 11. The light reflected by the first reflective polarizing plate 11 is converted into circularly polarized light by the first quarter wave plate 21 and enters the half mirror HM, where it is reflected. The light reflected by the half mirror HM becomes circularly polarized light in a direction reverse to the light before reflection. Hereinafter, for convenience of illustration, the light traveling in this path is referred to as "light of a path 1". In the cross-sectional views of the optical system according to the present embodiment shown in FIG. 1, FIG. 3, and FIG. 5, only the light of this path 1 is illustrated for clarity of the schematic configuration of the optical system.

Figure 8B:
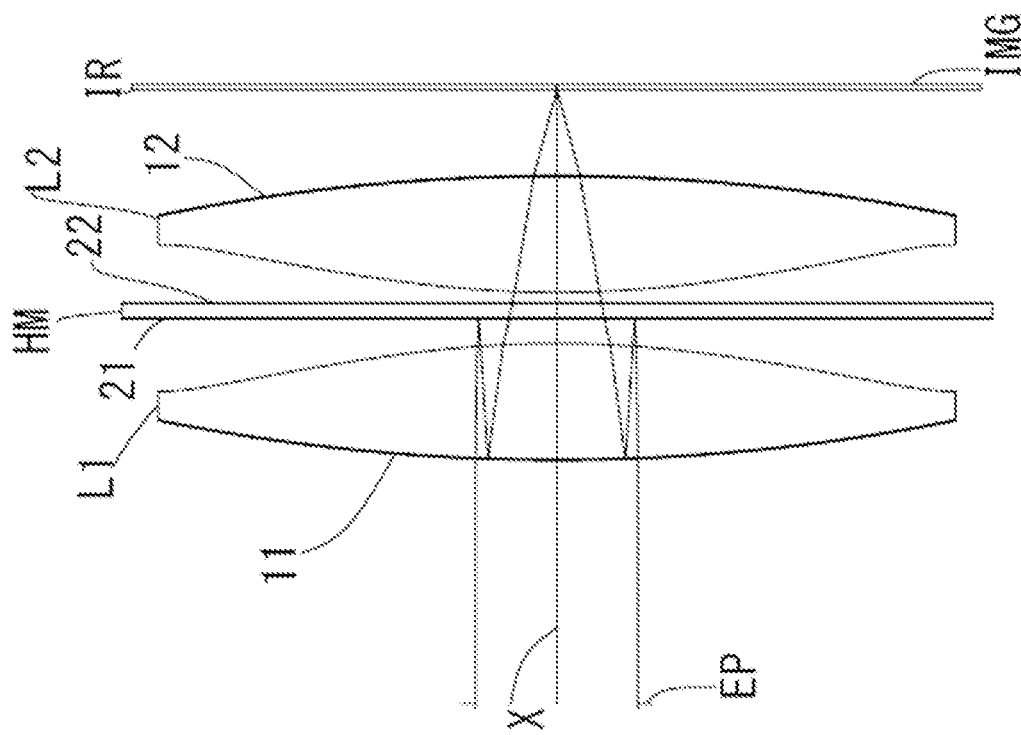
FIG. 8B is a cross-sectional view showing a path 2 in the optical system shown in FIG. 5.

On the other hand, as shown in FIG. 8B, a part of the light converted into circularly polarized light by the second quarter wave plate 22 and entered the half mirror HM is reflected and becomes circularly polarized light in the reverse direction, and returns to the second quarter wave plate 22. The circularly polarized light returning to the second quarter wave plate 22 is converted by the second quarter wave plate 22 into linearly polarized light having a polarization direction orthogonal to the polarization direction of the time when initially passing through the second reflective polarizing plate 12, and enters the second reflective polarizing plate 12. This linearly polarized light is reflected due to the polarization selectivity of the second reflective polarizing plate 12. The light reflected by the second reflective polarizing plate 12 is converted into circularly polarized light by the second quarter wave plate 22, and enters and passes through the half mirror HM. Hereinafter, for convenience of illustration, the light traveling in this path is referred to as "light of a path 2".

The light of the path 1 and the light of the path 2 converge at the half mirror HM part. The circularly polarized light converged at the half mirror HM part is converted by the first quarter wave plate 21 into linearly polarized light having a polarization direction orthogonal to the polarization direction of the time when initially passing through the second reflective polarizing plate 12, and enters the first reflective polarizing plate 11. This linearly polarized light passes through the first reflective polarizing plate 11 due to the polarization selectivity of the first reflective polarizing plate 11 and is guided to the pupil surface EP. Thus, according to the optical system of the present embodiment, the light quantity efficiency of the optical system can be improved, and the light quantity efficiency can be increased up to 50%. In addition, it is possible to reduce power consumption in the image display element.

On the other hand, a general conventional optical system of this type has a low light quantity efficiency of 25% or less, and to obtain a bright image at the pupil surface, it has been necessary to increase the luminance of the display surface. Herein, such a conventional optical system will be briefly described. The conventional optical system generally includes, in order from the pupil surface side to the display surface side, a reflective polarizing plate, a first quarter wave plate, a lens having a refractive power, a half mirror, and a second quarter wave plate. In this optical system, light emitted from the display surface passes through the second quarter wave plate, the half mirror, the lens, and the first quarter wave plate and is reflected by the reflective polarizing plate, and then enters the half mirror again. The light entered the half mirror is reflected at the half mirror and then passes through the first quarter wave plate and the reflective polarizing plate to reach the pupil surface. In this light path, since light enters the half mirror twice, the quantity of light reaching from the display surface to the pupil surface eventually becomes 25% or less. This means that in the conventional optical system, to obtain a brightness at the pupil surface comparable to the brightness in the optical system according to the present embodiment, it is necessary to increase the luminance of the display surface, which results in an increase in power consumption of the image display element.

In this respect, in the optical system according to the present embodiment, by actively using the light emitted from the display surface IMG and reflected at the half mirror HM as the light of the path 2, a light quantity efficiency higher than in the conventional art is achieved.

In the optical system of the present embodiment, preferable effects are achieved by satisfying Conditional Expressions (1) to (22) below.

$$-3.2 < r1/r2 < -0.9 \tag{1}$$

$$1.5 < (T1/f1) \times 100 < 7.0 \tag{2}$$

$$2.0 < f1/f < 6.5 \tag{3}$$

$$0.5 < f1/f2 < 1.5 \tag{4}$$

$$-1.5 < r1/r4 < -0.5 \tag{5}$$

$$-79 < r2/hm1 < -20 \tag{6}$$

$$55 < f2/hm2 < 285 \tag{7}$$

$$27 < vd2 < 84 \tag{8}$$

$$4.25 < (D1/f1) \times 100 < 16.50 \tag{9}$$

$$4.25 < (D2/f2) \times 100 < 16.50 \tag{10}$$

$$2.0 < f2/f < 6.5 \tag{11}$$

$$3 < r1/f < 10 \tag{12}$$

$$17.5 < r1/T1 < 71.0 \tag{13}$$

$$5.0 < r1/(D1+T1) < 18.5 \tag{14}$$

$$-1.5 < r2/r3 < -0.5 \tag{15}$$

$$-5.5 < r2/f < -1.5 \tag{16}$$

$$-40.0 < r2/T1 < -8.5 \tag{17}$$

$$1.5 < r3/f < 5.5 \tag{18}$$

$$0.35 < r3/f2 < 1.25 \tag{19}$$

$$-0.85 < r3/r4 < -0.20 \tag{20}$$

$$-10 < r4/f < -3 \tag{21}$$

$$-2.5 < r4/f2 < -0.7 \tag{22}$$

where vd2: Abbe number with respect to a d-line of the second lens L2
D1: Thickness of the first lens L1 on an optical axis X
D2: Thickness of the second lens L2 on the optical axis X
T1: Distance on the optical axis X from the surface of the first lens L1 on the display surface side to the surface of the second lens L2 on the pupil surface side
hm1: Distance on the optical axis X from the surface of the first lens L1 on the display surface side to the surface of the half mirror HM on the pupil surface side
hm2: Distance on the optical axis X from the surface of the half mirror HM on the display surface side to the surface of the second lens L2 on the pupil surface side
f: Focal length of the entire optical system
f1: Focal length of the first lens L1
f2: Focal length of the second lens L2
r1: Paraxial curvature radius of the surface of the first lens L1 on the pupil surface side
r2: Paraxial curvature radius of the surface of the first lens L1 on the display surface side
r3: Paraxial curvature radius of the surface of the second lens L2 on the pupil surface side
r4: Paraxial curvature radius of the surface of the second lens L2 on the display surface side.

It is not necessary to satisfy all of the above conditional expressions, and by satisfying each conditional expression individually, the action and effect corresponding to the conditional expression can be obtained.

Further, in the optical system of the present embodiment, more preferable effects are achieved by satisfying Conditional Expressions (1a) to (22a) below.

$$-2.6 < r1/r2 < -1.0 \tag{1a}$$

$$2 < (T1/f1) \times 100 < 6 \tag{2a}$$

$2.5 < f1/f < 5.5$ (3a)

$0.75 < f1/f2 < 1.25$ (4a)

$-1.25 < r1/r4 < -0.75$ (5a)

$-66 < r2/hm1 < -30$ (6a)

$85 < f2/hm2 < 235$ (7a)

$41 < vd2 < 70$ (8a)

$6.5 < (D1/f1) \times 100 < 14.0$ (9a)

$6.5 < (D2/f2) \times 100 < 14.0$ (10a)

$2.5 < f2/f < 5.5$ (11a)

$4.5 < r1/f < 8.5$ (12a)

$25 < r1/T1 < 60$ (13a)

$7.5 < r1/(D1+T1) < 15.5$ (14a)

$-1.25 < r2/r3 < -0.75$ (15a)

$-4.5 < r2/f < -2.0$ (16a)

$-33.0 < r2/T1 < -12.5$ (17a)

$2.0 < r3/f < 4.5$ (18a)

$0.55 < r3/f2 < 1.05$ (19a)

$-0.7 < r3/r4 < 0.3$ (20a)

$-8.5 < r4/f < -4.5$ (21a)

$-2.1 < r4/f2 < -1.0$ (22a)

where the symbols in each conditional expression are the same as described in the preceding paragraphs. The lower limit values or upper limit values of corresponding Conditional Expressions (1) to (22) may be respectively applied as the lower limit values or upper limit values of Conditional Expressions (1a) to (22a).

In the present embodiment, the aspherical shape adopted as the aspherical surface of the lens surface is represented by Formula 1 in the case where an axis in the optical axis direction is Z, a height in a direction orthogonal to the optical axis is H, a paraxial curvature radius is R, a conic coefficient is k, and aspherical coefficients are A4, A6, A8, A10, A12, A14, A16, A18, and A20.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}.$$
[Formula 1]

Next, examples of the optical system according to the present embodiment will be illustrated. In each example, f represents a focal length of the entire optical system, Fno represents an F-number, ω represents a half angle of view, ih represents a maximum image height, and TTL represents a total optical length. Herein, the total optical length is defined as a distance on the optical axis from the pupil surface to the display surface. The values of the total optical length and back focus are distances obtained by air-converting the thickness of the filter IR arranged between the optical system and the display surface IMG.

Further, i represents a surface number counted from the pupil surface side, r represents a paraxial curvature radius, d represents a distance on the optical axis between lens surfaces (surface spacing), Nd represents a refractive index of the d-line (reference wavelength), and vd represents an Abbe number with respect to the d-line. For aspherical surfaces, an asterisk (*) symbol is labeled after the surface number i.

Figure 2:
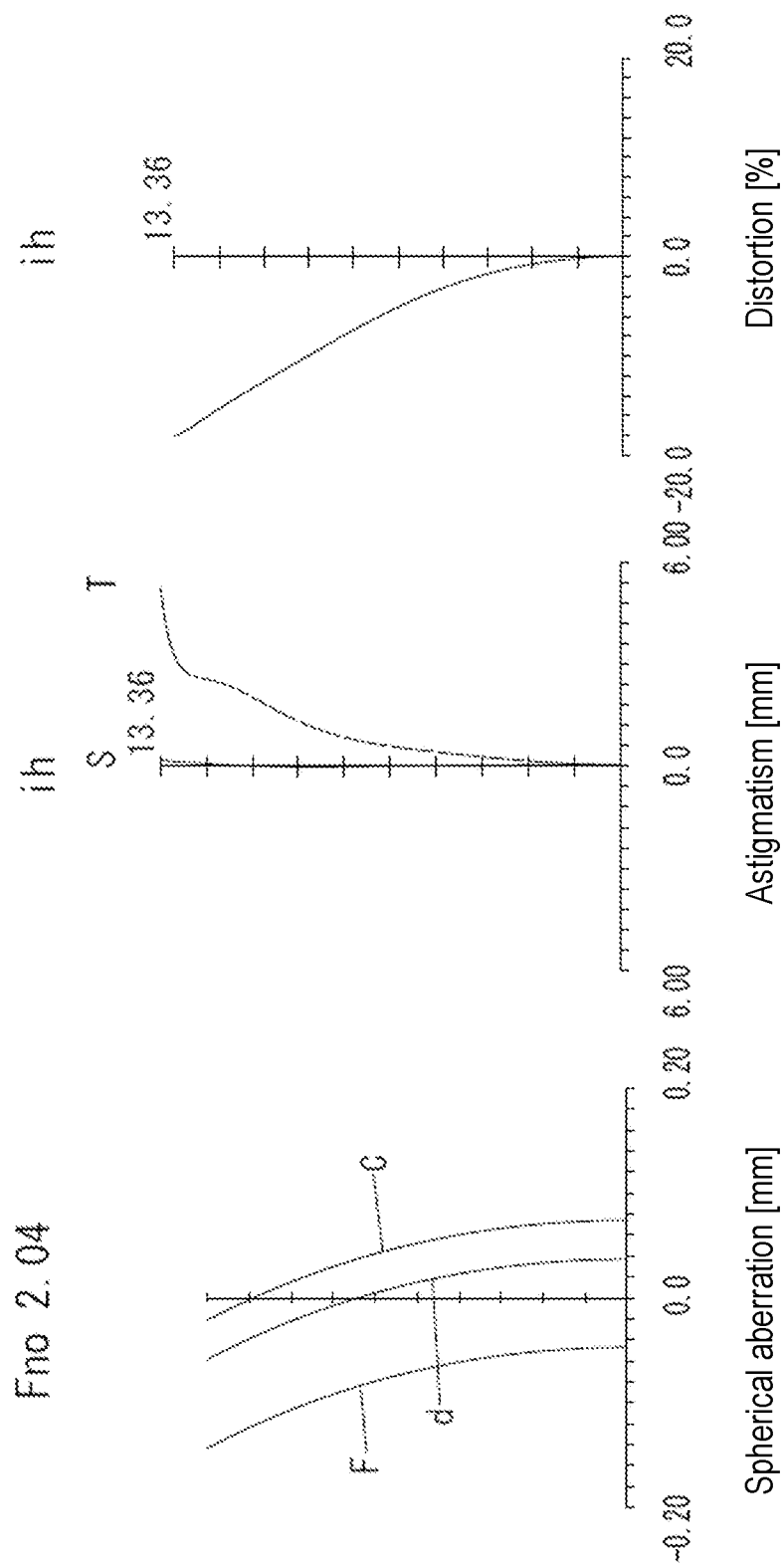
FIG. 2 is an aberration diagram showing spherical aberration, astigmatism, and distortion of the optical system according to Example 1 of the disclosure.
Figure 4:
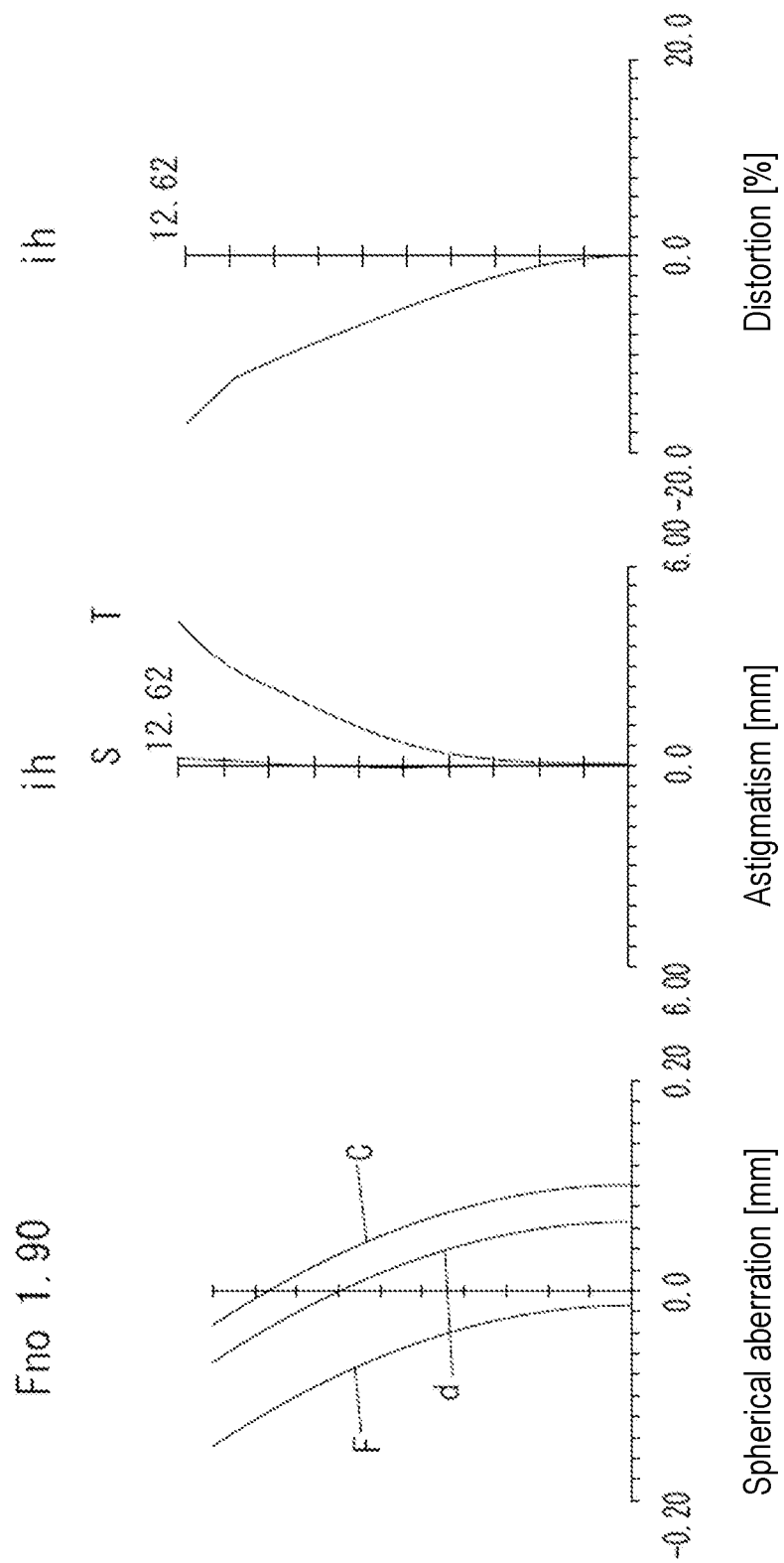
FIG. 4 is an aberration diagram showing spherical aberration, astigmatism, and distortion of the optical system according to Example 2 of the disclosure.
Figure 6:
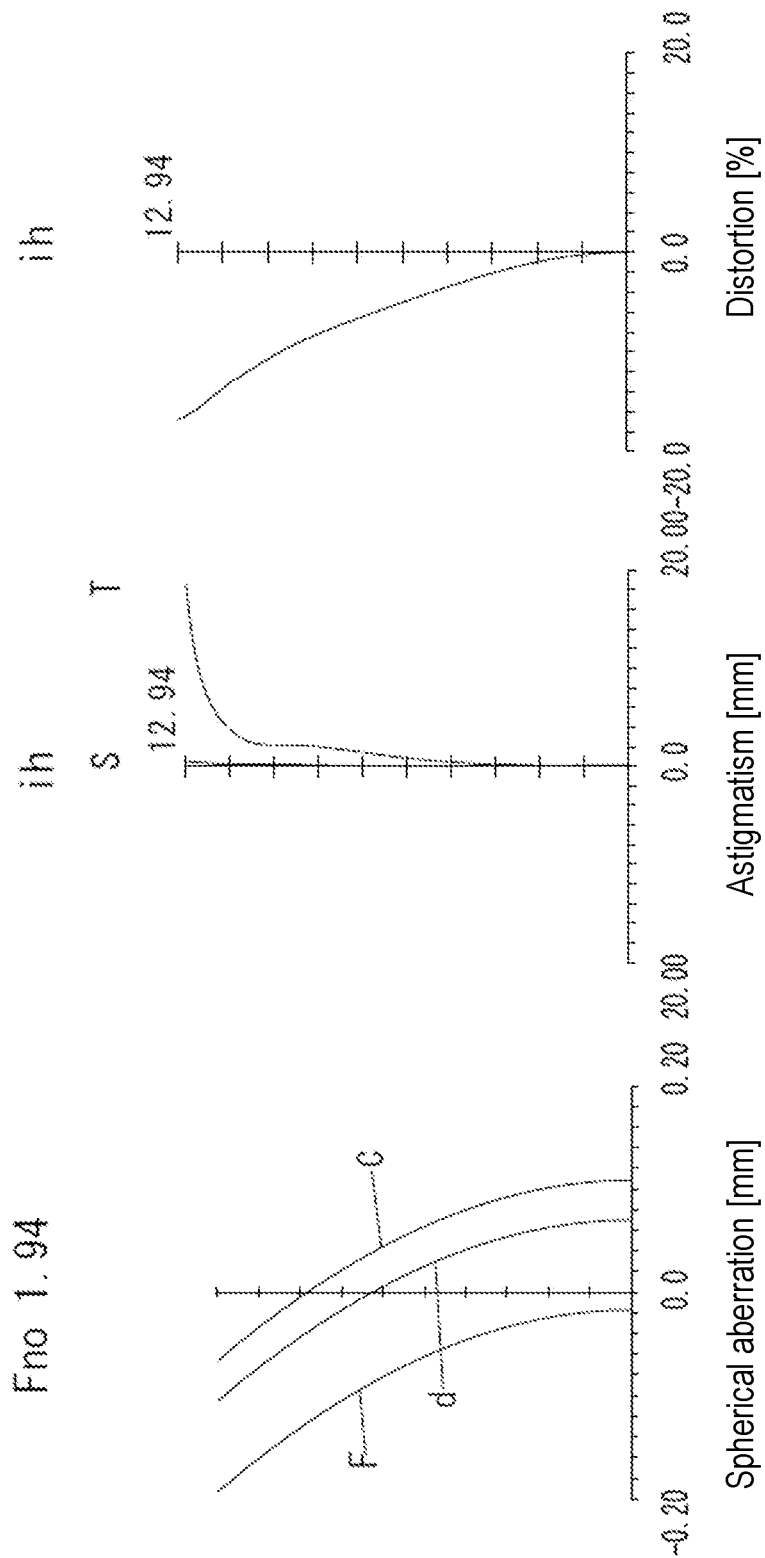
FIG. 6 is an aberration diagram showing spherical aberration, astigmatism, and distortion of the optical system according to Example 3 of the disclosure.

In the optical system of each example, the spacing on the optical axis between the pupil surface EP, which serves as an eye point, and the lens surface closest to the pupil surface is referred to as a pupil distance. In the evaluation of aberrations, the aberration of light rays reaching the pupil surface EP from light-emitting points provided on the display surface side and the aberration of light rays reaching the display surface IMG from light-emitting points provided on the pupil surface EP side correspond to each other in a one-to-one manner. Thus, in each example, the aberration of light rays reaching the display surface IMG will be evaluated. FIG. 2, FIG. 4, and FIG. 6 show aberration diagrams in the case where an observer's (human) pupil diameter is set to Φ8.0 mm and the pupil distance is set to 12 mm in the optical systems of Examples 1 to 3.

Example 1

The basic lens data are shown in Table 1 below.

TABLE 1

Unit: mm f = 16.29
Fno = 2.04
ω(°) = 45.0
ih = 13.36
TTL = 32.00

Surface data

| i | r | d | Nd | vd |
|---|---|---|---|---|
| 1 (pupil surface) | Infinity | 12.0000 | | |
| 2 | 100.0000 | 0.0000 | 1.492 | 57.44 |
| 3 | 100.0000 | 0.0880 | 1.492 | 57.44 |
| 4 | 100.0000 | 0.0000 | | |
| 5 | 100.0000 | 6.9000 | 1.535 | 55.69 (vd1) |
| 6* | −55.9314 | 1.0000 | | |
| 7 | Infinity | 0.0620 | 1.492 | 57.44 |
| 8 (reflective surface) | Infinity | 0.0000 | | |
| 9 | Infinity | −0.0620 | 1.492 | 57.44 |
| 10 | Infinity | −1.0000 | | |
| 11* | −55.9314 | −6.9000 | 1.535 | 55.69 |
| 12 | 100.0000 | 0.0000 | | |
| 13 | 100.0000 | −0.0880 | 1.492 | 57.44 |
| 14 (reflective surface) | 100.0000 | 0.0000 | | |
| 15 | 100.0000 | 0.0880 | 1.492 | 57.44 |
| 16 | 100.0000 | 0.0000 | | |
| 17 | 100.0000 | 6.9000 | 1.535 | 55.69 |
| 18* | −55.9314 | 1.0000 | | |
| 19 | Infinity | 0.0620 | 1.492 | 57.44 |
| 20 | Infinity | 0.7000 | 1.517 | 64.20 |
| 21 | Infinity | 0.0620 | 1.492 | 57.44 |
| 22 | Infinity | 0.3000 | | |
| 23* | 55.9314 | 6.9000 | 1.535 | 55.69 (vd2) |
| 24 | −100.0000 | 0.0000 | | |
| 25 | −100.0000 | 0.0880 | 1.492 | 57.44 |
| 26 | −100.0000 | 0.0000 | 1.492 | 57.44 |
| 27 | −100.0000 | 3.6130 | | |
| 28 | Infinity | 0.2870 | 1.458 | 67.82 |
| 29 | Infinity | 0.0000 | | |
| Display surface | Infinity | | | |

TABLE 1-continued

Unit: mm

Single lens data

| Lens | Starting surface | Focal length |
|---|---|---|
| 1 | 5 | 68.119 |
| 2 | 23 | 68.119 |

Aspherical surface data

| | 6th surface | 23rd surface |
|---|---|---|
| k | 0.000000E+00 | 0.000000E+00 |
| A4 | 9.104366E−06 | −9.104366E−06 |
| A6 | −2.235195E−08 | 2.235195E−08 |
| A8 | 1.275941E−10 | −1.275941E−10 |
| A10 | −3.547785E−13 | 3.547785E−13 |
| A12 | 3.913344E−16 | −3.913344E−16 |
| A14 | −5.139519E−20 | 5.139519E−20 |
| A16 | 0.000000E+00 | 0.000000E+00 |
| A18 | 0.000000E+00 | 0.000000E+00 |
| A20 | 0.000000E+00 | 0.000000E+00 |

The optical system of Example 1 satisfies Conditional Expressions (1) to (22) as shown in Table 4.

FIG. 2 shows spherical aberration (mm), astigmatism (mm), and distortion (%) of the optical system of Example 1. The spherical aberration diagram shows the aberration amounts with respect to each wavelength of an F-line (486 nm), a d-line (588 nm), and a C-line (656 nm). Further, the astigmatism diagram shows the aberration amount (solid line) of the d-line in a sagittal image plane S and the aberration amount (dashed line) of the d-line in a tangential image plane T, respectively (the same applies to FIG. 4 and FIG. 6). As shown in FIG. 2, each aberration is well corrected.

Example 2

The basic lens data are shown in Table 2 below.

TABLE 2

Unit: mm f = 15.18
Fno = 1.90
ω(°) = 45.0
ih = 12.62
TTL = 30.60

Surface data

| i | r | d | Nd | vd |
|---|---|---|---|---|
| 1 (pupil surface) | Infinity | 12.0000 | | |
| 2 | 100.0000 | 0.0000 | 1.492 | 57.44 |
| 3 | 100.0000 | 0.0880 | 1.492 | 57.44 |
| 4 | 100.0000 | 0.0000 | | |
| 5 | 100.0000 | 6.6000 | 1.535 | 55.69 (vd1) |
| 6* | −46.8729 | 1.0131 | | |
| 7 | Infinity | 0.0620 | 1.492 | 57.44 |
| 8 (reflective surface) | Infinity | 0.0000 | | |
| 9 | Infinity | −0.0620 | 1.492 | 57.44 |
| 10 | Infinity | −1.0131 | | |
| 11* | −46.8729 | −6.6000 | 1.535 | 55.69 |
| 12 | 100.0000 | 0.0000 | | |
| 13 | 100.0000 | −0.0880 | 1.492 | 57.44 |
| 14 (reflective surface) | 100.0000 | 0.0000 | | |
| 15 | 100.0000 | 0.0880 | 1.492 | 57.44 |
| 16 | 100.0000 | 0.0000 | | |
| 17 | 100.0000 | 6.6000 | 1.535 | 55.69 |
| 18* | −46.8729 | 1.0131 | | |
| 19 | Infinity | 0.0620 | 1.492 | 57.44 |
| 20 | Infinity | 0.7000 | 1.517 | 64.20 |
| 21 | Infinity | 0.0620 | 1.492 | 57.44 |
| 22 | Infinity | 0.3131 | | |
| 23* | 46.8729 | 6.6000 | 1.535 | 55.69 (vd2) |
| 24 | −100.0000 | 0.0000 | | |
| 25 | −100.0000 | 0.0880 | 1.492 | 57.44 |
| 26 | −100.0000 | 0.0000 | 1.492 | 57.44 |
| 27 | −100.0000 | 2.7868 | | |
| 28 | Infinity | 0.2870 | 1.458 | 67.82 |
| 29 | Infinity | 0.0000 | | |
| Display surface | Infinity | | | |

Single lens data

| Lens | Starting surface | Focal length |
|---|---|---|
| 1 | 5 | 60.623 |
| 2 | 23 | 60.623 |

Aspherical surface data

| | 6th surface | 23rd surface |
|---|---|---|
| k | 0.000000E+00 | 0.000000E+00 |
| A4 | 8.187990E−06 | −8.187990E−06 |
| A6 | 2.640450E−08 | −2.640450E−08 |
| A8 | −1.299209E−10 | 1.299209E−10 |
| A10 | 2.589695E−13 | −2.589695E−13 |
| A12 | −2.103114E−16 | 2.103114E−16 |
| A14 | 2.382718E−20 | −2.382718E−20 |
| A16 | 0.000000E+00 | 0.000000E+00 |
| A18 | 0.000000E+00 | 0.000000E+00 |
| A20 | 0.000000E+00 | 0.000000E+00 |

The optical system of Example 2 satisfies Conditional Expressions (1) to (22) as shown in Table 4.

FIG. 4 shows spherical aberration (mm), astigmatism (mm), and distortion (%) of the optical system of Example 2. As shown in FIG. 4, each aberration is well corrected.

Example 3

The basic lens data are shown in Table 3 below.

TABLE 3

Unit: mm f = 15.52
Fno = 1.94
ω(°) = 45.0
ih = 12.94
TTL = 30.60

Surface data

| i | r | d | Nd | vd |
|---|---|---|---|---|
| 1 (pupil surface) | Infinity | 12.0000 | | |
| 2 | 100.0000 | 0.0000 | 1.492 | 57.44 |
| 3 | 100.0000 | 0.0880 | 1.492 | 57.44 |
| 4 | 100.0000 | 0.0000 | | |
| 5 | 100.0000 | 5.7121 | 1.535 | 55.69 (vd1) |
| 6* | −52.6351 | 1.2009 | | |
| 7 | Infinity | 0.0620 | 1.492 | 57.44 |
| 8 (reflective surface) | Infinity | 0.0000 | | |
| 9 | Infinity | −0.0620 | 1.492 | 57.44 |
| 10 | Infinity | −1.2009 | | |
| 11* | −52.6351 | −5.7121 | 1.535 | 55.69 |
| 12 | 100.0000 | 0.0000 | | |
| 13 | 100.0000 | −0.0880 | 1.492 | 57.44 |
| 14 (reflective surface) | 100.0000 | 0.0000 | | |
| 15 | 100.0000 | 0.0880 | 1.492 | 57.44 |
| 16 | 100.0000 | 0.0000 | | |

TABLE 3-continued

Unit: mm

| | | | | |
|---|---|---|---|---|
| 17 | 100.0000 | 5.7121 | 1.535 | 55.69 |
| 18* | −52.6351 | 1.2009 | | |
| 19 | Infinity | 0.0620 | 1.492 | 57.44 |
| 20 | Infinity | 0.7000 | 1.517 | 64.20 |
| 21 | Infinity | 0.0620 | 1.492 | 57.44 |
| 22 | Infinity | 0.5009 | | |
| 23* | 52.6351 | 5.7121 | 1.535 | 55.69 (vd2) |
| 24 | −100.0000 | 0.0000 | | |
| 25 | −100.0000 | 0.0880 | 1.492 | 57.44 |
| 26 | −100.0000 | 0.0000 | 1.492 | 57.44 |
| 27 | −100.0000 | 4.2481 | | |
| 28 | Infinity | 0.2260 | 1.458 | 67.82 |
| 29 | Infinity | 0.0000 | | |
| Display surface | Infinity | | | |

Single lens data

| Lens | Starting surface | Focal length |
|---|---|---|
| 1 | 5 | 65.331 |
| 2 | 23 | 65.331 |

Aspherical surface data

| | 6th surface | 23rd surface |
|---|---|---|
| k | 0.000000E+00 | 0.000000E+00 |
| A4 | 6.838552E−06 | −6.838552E−06 |
| A6 | 3.247035E−08 | −3.247035E−08 |
| A8 | −1.410363E−10 | 1.410363E−10 |
| A10 | 1.002050E−13 | −1.002050E−13 |
| A12 | 2.840480E−16 | −2.840480E−16 |
| A14 | −5.579512E−20 | 5.579512E−20 |
| A16 | 0.000000E+00 | 0.000000E+00 |
| A18 | 0.000000E+00 | 0.000000E+00 |
| A20 | 0.000000E+00 | 0.000000E+00 |

The optical system of Example 3 satisfies Conditional Expressions (1) to (22) as shown in Table 4.

FIG. 6 shows spherical aberration (mm), astigmatism (mm), and distortion (%) of the optical system of Example 3. As shown in FIG. 6, each aberration is well corrected.

Table 4 shows the values of Conditional Expressions (1) to (22) in the optical systems of Example 1 to Example 3.

TABLE 4

| Conditional expression | Example 1 | Example 2 | Example 3 |
|---|---|---|---|
| (1) r1/r2 | −1.79 | −2.13 | −1.90 |
| (2) (T1/f1) × 100 | 3.12 | 3.55 | 3.87 |
| (3) f1/f | 4.18 | 3.99 | 4.21 |
| (4) f1/f2 | 1.00 | 1.00 | 1.00 |
| (5) r1/r4 | −1.00 | −1.00 | −1.00 |
| (6) r2/hm1 | −52.67 | −43.60 | −41.68 |
| (7) f2/hm2 | 188.73 | 161.61 | 116.06 |
| (8) vd2 | 55.69 | 55.69 | 55.69 |
| (9) (D1/f1) × 100 | 10.13 | 10.89 | 8.74 |
| (10) (D2/f2) × 100 | 10.13 | 10.89 | 8.74 |
| (11) f2/f | 4.18 | 3.99 | 4.21 |
| (12) r1/f | 6.14 | 6.59 | 6.44 |
| (13) r1/T1 | 47.08 | 46.51 | 39.59 |
| (14) r1/(D1 + T1) | 11.08 | 11.43 | 12.14 |
| (15) r2/r3 | −1.00 | −1.00 | −1.00 |
| (16) r2/f | −3.43 | −3.09 | −3.39 |
| (17) r2/T1 | −26.33 | −21.80 | −20.84 |
| (18) r3/f | 3.43 | 3.09 | 3.39 |
| (19) r3/f2 | 0.82 | 0.77 | 0.81 |
| (20) r3/r4 | −0.56 | −0.47 | −0.53 |
| (21) r4/f | −6.14 | −6.59 | −6.44 |
| (22) r4/f2 | −1.47 | −1.65 | −1.53 |

In the case of applying the optical system according to the disclosure to an image display device, it is possible to achieve miniaturization of the image display device, improvement in light quantity efficiency, and enhancement of performance.

What is claimed is:

1. An optical system comprising in order from a pupil surface side to a display surface side:
    a first reflective polarizing plate;
    a first lens having a positive refractive power;
    a half mirror;
    a second lens having a positive refractive power; and
    a second reflective polarizing plate,
    the optical system further comprising:
    a first quarter wave plate arranged between a pupil surface and the half mirror; and
    a second quarter wave plate arranged between the half mirror and a display surface, wherein
    the second lens has a paraxially convex surface on the pupil surface side, and
    the optical system satisfies Conditional Expression below:

$-3.2 < r1/r2 < -0.9$, wherein
    r1 is a paraxial curvature radius of a surface of the first lens on the pupil surface side, and
    r2 is a paraxial curvature radius of a surface of the first lens on the display surface side.

2. The optical system according to claim 1, satisfying Conditional Expression below:

$1.5 < (T1/f1) \times 100 < 7.0$, wherein
    T1 is a distance on an optical axis from the surface of the first lens on the display surface side to a surface of the second lens on the pupil surface side, and
    f1 is a focal length of the first lens.

3. The optical system according to claim 1, satisfying Conditional Expression below:
    $2.0 < f1/f < 6.5$,
    wherein
    f1 is a focal length of the first lens, and
    f is a focal length of the entire optical system.

4. The optical system according to claim 1, satisfying Conditional Expression below:

$0.5 < f1/f2 < 1.5$, wherein
    f1 is a focal length of the first lens, and
    f2 is a focal length of the second lens.

5. The optical system according to claim 1, satisfying Conditional Expression below:

$-1.5 < r1/r4 < -0.5$, wherein
    r1 is the paraxial curvature radius of the surface of the first lens on the pupil surface side, and
    r4 is a paraxial curvature radius of a surface of the second lens on the display surface side.

6. The optical system according to claim 1, satisfying Conditional Expression below:

$-79 < r2/hm1 < -20$, wherein
    r2 is the paraxial curvature radius of the surface of the first lens on the display surface side, and
    hm1 is a distance on an optical axis from the surface of the first lens on the display surface side to a surface of the half mirror on the pupil surface side.

7. The optical system according to claim 1, satisfying Conditional Expression below:

$$55 < f2/hm2 < 285,$$

wherein f2 is a focal length of the second lens, and hm2 is a distance on an optical axis from a surface of the half mirror on the display surface side to a surface of the second lens on the pupil surface side.

* * * * *